United States Patent
Hui

(10) Patent No.: US 8,108,652 B1
(45) Date of Patent: Jan. 31, 2012

(54) VECTOR PROCESSING WITH HIGH EXECUTION THROUGHPUT

(76) Inventor: Ronald Chi-Chun Hui, Hong Kong (HK)

( * ) Notice: Subject to any disclaimer, the term of this patent is extended or adjusted under 35 U.S.C. 154(b) by 603 days.

(21) Appl. No.: 12/207,645

(22) Filed: Sep. 10, 2008

Related U.S. Application Data

(60) Provisional application No. 60/993,370, filed on Sep. 13, 2007.

(51) Int. Cl.
 G06F 15/76 (2006.01)
 G06F 9/312 (2006.01)
(52) U.S. Cl. .......................... 712/4; 712/207
(58) Field of Classification Search ........... 712/4, 207
 See application file for complete search history.

(56) References Cited

U.S. PATENT DOCUMENTS

| | | | | |
|---|---|---|---|---|
| 4,760,525 A | * | 7/1988 | Webb | 712/2 |
| 5,113,521 A | * | 5/1992 | McKeen et al. | 714/15 |
| 5,263,144 A | * | 11/1993 | Zurawski et al. | 711/121 |
| 5,727,229 A | * | 3/1998 | Kan et al. | 712/22 |
| 5,887,183 A | * | 3/1999 | Agarwal et al. | 712/2 |
| 6,289,438 B1 | * | 9/2001 | Takayanagi | 712/218 |
| 6,317,819 B1 | * | 11/2001 | Morton | 712/22 |
| 6,738,837 B1 | | 5/2004 | Wyland | |
| 6,813,701 B1 | | 11/2004 | Ansari | |
| 7,124,318 B2 | * | 10/2006 | Luick | 714/10 |
| 7,203,800 B2 | | 4/2007 | Barlow | |
| 2003/0225998 A1 | * | 12/2003 | Khan et al. | 712/210 |

* cited by examiner

Primary Examiner — Daniel Pan
(74) Attorney, Agent, or Firm — Ella Cheong Hong Kong; Margaret A. Burke; Sam T. Yip

(57) ABSTRACT

The claimed invention is an efficient and high-performance vector processor. Through minimizing the use of multiple banks of memory and/or multi-ported memory blocks to reduce implementation cost, vector memory 450 provides abundant memory bandwidth and enables sustained low-delay memory operations for a large number of SIMD (Single Instruction, Multiple Data) or vector operators simultaneously.

20 Claims, 4 Drawing Sheets

VECTOR PROCESSING WITH HIGH EXECUTION THROUGHPUT

CROSS-REFERENCE TO RELATED APPLICATION

This application claims priority to provisional patent application No. 60/993,370 filed Sep. 13, 2007, the disclosure of which is incorporated by reference in full.

FIELD OF THE INVENTION

The claimed invention relates to enhanced computer operations. The claimed invention more specifically applies to optimized computer memory access method. With greater particularity, the claimed invention applies to vector memory utilized to increase memory bandwidth while minimizing the use of multiple memory banks.

BACKGROUND OF THE INVENTION

As computational complexity expands, novel memory handling systems arise to reduce cost while increasing efficiency. To support a large number of vector operations simultaneously, the memory subsystem of a vector processing system must have a very large memory bandwidth. A traditional vector processor has multiple large blocks of vector memory connected to the vector processor via a crossbar. As memory block size increases, the memory access latency also increases. Moreover, as the number of memory blocks increases to support more parallel vector operations, the area of the crossbar also increases due to longer wire lengths and larger number of wires. Consequently, present vector memory applications are limited by the aforesaid constraints.

SUMMARY OF THE INVENTION

Traditionally, most DSP (Digital Signal Processing) applications spend most of the execution time on loops. Typically, different iterations of a loop have no data dependency with each other. Therefore, for a vector processor, a single instruction is issued to process multiple data from different iterations simultaneously, which is also known as SIMD (Single Instruction, Multiple Data), achieving loop-level parallelism.

The claimed invention relates to an efficient and high-performance vector processor designed for low cost implementation. Performance is achieved through the minimized use of multiple banks of memory as well as multi-ported memory blocks to reduce costs associated with implementation. Performance is enhanced through the use of abundant memory bandwidth to enable sustained low-delay memory operations for a large number of SIMD or vector operators simultaneously. An additional consequence of the claimed invention is the reduction of prefetch-use latency.

The vector DSP architecture includes an execution unit, an instruction cache, a data cache, a vector memory, a vector store queue and a prefetch unit. Before vector processing starts, the vector processor issues a series of prefetch commands to the prefetch unit to prefetch the data to be used in the loop so that the vector execution unit can execute vector instructions with the prefetched data later. The instruction cache stores any instructions. In an embodiment, these instructions are those used for both scalar and vector instructions. The execution unit is connected to the instruction cache so that the execution unit can access instructions stored in the instruction cache.

The execution unit is also connected to a prefetch unit. The vector processor issues prefetch commands to the prefetch unit. After receiving the prefetch commands, the prefetch unit will start to prefetch all the required data from multiple memory locations from the L1 or L2 cache until all requested data are prefetched through its connection to L1 or L2 cache.

The prefetch unit is connected to a vector memory. The prefetched data will be stored in the vector memory first and later loaded by the vector processor. The vector memory is also connected to the execution unit, providing the execution unit with an access to the data stored in the vector memory. The vector memory, apart from being used as a prefetch buffer, can also be used as a general-purpose data memory. Therefore, before selecting the storage locations of the prefetched data, programmers need to keep track of the locations of the useful data in the vector memory so as not to overwrite it. In case of data-cache miss, the prefetch unit will be stalled until the missed data is refilled. While performing data prefetching, the vector processor is free to execute other instructions.

In the illustrative example of a preferred embodiment, after the required data is prefetched to the vector memory, the vector processor issues vector load commands to transfer multiple data from the vector memory to the vector register file. Then the vector processor can execute vector instructions and write back the results in the vector register files. Afterwards, the vector processor stores the result from the vector register file to the vector memory or the data cache under vector store commands via the store queue.

In order to support the vector unit to load multiple data from or store multiple data in the vector memory simultaneously, the vector memory includes multiple banks of small memory blocks, where each of them can be accessed independently with different addresses through a crossbar. To further increase the bandwidth, each memory block in the vector memory module can be dual ported. When the values of a vector register are being loaded or stored, the register values can be split into multiple small pieces and loaded from or stored in different banks of the vector memory. Meanwhile, the vector processor can also simultaneously store multiple pieces of data to the data cache via the vector store queue. The vector store instruction hardware in the vector execution unit is connected to the store queue which is further connected to the data cache. Since the register data width is much wider than the data cache, the written-back data is first stored into a vector store queue in one cycle, which will then in turn store the data back to the data cache in multiple cycles. The store queue consists of multiple FIFO (First In, First Out) queues and so it can receive multiple data from the vector DSP simultaneously. Since not all cache write requests can be served simultaneously, each non-empty FIFO queues will contend to access the write ports of the data cache via crossbar or multiplexer until all queues are cleared.

With existing ASIC manufacturing technology, the memory latency and storage capacity are two contradictory engineering parameters. Using conventional methods, it is only possible to build either small and fast memory or large and slow memory. Following the aforementioned design constraints, the vector memory is preferred to have a small storage size and a large memory bandwidth. In another embodiment, the vector memory is also implemented with dual-ported RAM to further double the bandwidth. Although dual-ported RAM is physically larger than single-ported RAM of the same memory capacity, the vector memory blocks are only a small part of the whole system and so the dual-ported memory blocks have little impact on the total implementation cost. Meanwhile, the corresponding data cache is preferred to have a larger storage size and a small memory bandwidth.

When the execution unit is not executing any vector instruction, it can also function as a RISC (Reduced Instruction Set Computer) by accessing the data cache and executing scalar instructions. Since both the vector and scalar instructions can access the data cache and the register file, the processor can switch between scalar and vector processing mode seamlessly.

For reducing power consumption, the data cache can be completely turned off for a long period if the execution unit executes vector instructions only and does not need to access the data cache. Alternatively, the vector memory can be completely turned off for a long period if the execution unit executes scalar instructions only and does not need to access vector memory.

In a preferred embodiment, a prefetch address generator is used to optimize the prefetching performance. To do so, it is necessary to issue the prefetch commands before the prefetch data are used. However, in practice, it may be difficult on the software level to perform prefetching early enough to optimize performance. As a result, it is desirable in a preferred embodiment, on the hardware level, to reduce the delay (the prefetch-use latency) between the time when the prefetch commands are issued and the time when the prefetched data are used. While being implemented in a preferred embodiment, the prefetch unit contains a prefetch address generator to reduce the prefetch-use latency.

When applying vector processing in loop execution, in most cases, it is required to prefetch multiple data streams from the L1 or L2 cache or the main memory to the vector memory, where each stream corresponds to a data array. In an embodiment of the claimed invention, the 1D-stream is defined as an ordered collection of words $\{w_i\}$ characterized by 3 parameters where the 1D-base-address is the address of the first data in the stream, i.e. $w_0$. The 1D-count refers to the number of words in the stream and the 1D-stride is the constant difference of memory addresses of each pair of consecutive words, i.e. $w_i$ and $w_{i+1}$, where $0 \leq i < $ 1D-count.

In one embodiment, an ordered collection of 1D-streams form a more complex stream, called 2D-stream where each 1D-stream has the identical 1D-count and 1D-stride. Similarly, a 2D-stream is defined by the following three parameters: 2D-base-address which is the address of the first word of the first 1D-stream; 2D-count which is the number of 1D-streams; and 2D-stride which is the constant difference of the first memory addresses of each pair of consecutive 1D-streams After prefetching, a stream in the data cache which is designated as the source stream is mapped to another stream in the vector memory which is designated as the destination stream. Though the number of words and the word contents of the destination stream are identical to that of the source stream, it is possible to change other parameters of the destination stream during prefetching, such as base addresses, 1D-strides and 2D-strides. Table 1 details the notation of source and destination streams.

TABLE 1

| Source Stream | Destination Stream | Remark |
|---|---|---|
| Src | dest | Corresponds to base address |
| d1_src_strd | d1_dst_strd | Corresponds to 1D stride |
| d2_src_strd | d2_dst_strd | Corresponds to 2D stride |
| d1_cnt | | Identical |
| | d2_cnt | Identical |

The most commonly-used forms of loops in DSP applications are one-level loops and two-level loops. In an illustrative embodiment of the claimed invention, the vector prefetch unit is used for two-level loop. One-level loop can be considered a special case of a two-level nested loop when the innermost has one iteration only. Without loss of generality, the basic concept can be applied to a nested loop for more levels.

Typically, each iteration loads data from multiple data arrays. The data of an array which are fetched across different iterations of a two-level loop can be mapped to a 2D-stream. As there are multiple arrays in a loop, multiple 2D-streams have to be prefetched. A vector instruction uses only some data from each stream. Therefore, instead of completely prefetching a stream before prefetching other streams, the prefetch unit 106 fetches a portion of data, say a 1D-stream, from each 2D-stream in a round-robin way so as to quickly deliver sufficient data for the execution unit to start executing vector instructions, thus reducing prefetch-use latency.

In one of the preferred embodiment, it is assumed that the 2D-count of all 2D-streams are identical while all other parameters of each 2D-stream may be different. The pseudo code of the operations for fetching data from multiple 2D-streams in the prefetch unit is shown as follows:

```
for(d2=0; d2<d2_cnt; d2++) { //for each 1D-stream of any 2D-stream
    for(s=0; s<strm_cnt; s++) { //To fetch a 1D-stream
        of each 2D-stream in a round robin manner
        for(d1=0; d1<d1_cnt[s]; d1++) {
            //for each word in the current 1D-stream
            src=strm[s].src + d1 * strm[s].d1_src_strd +
                d2 * strm[s].d2_src_strd;
            dst=strm[s].dst + d1 * strm[s].d1_dst_strd +
                d2 * strm[s].d2_dst_strd;
            vmem[dst]=cache[src];
        }
    }
}
```

As shown, strm_cnt is the number of 2D-streams, which corresponds to the number of arrays that is used in vector processing. strm[ ] is an array of data structures containing the individual parameters for all streams, including source addresses, destination addresses, 1D source strides, 2D source strides, 1D destination strides and 2D destination strides. The whole prefetching process is divided into a number of iterations. In each iteration, the prefetch unit will fetch the $(d2)^{th}$ 1D-streams of all 2D-streams. Each 1D-stream is completely prefetched before the fetching of another 1D-stream starts. d2 is an integer variable starts from 0 and in each iteration d2 is incremented by 1 until d2 reaches (d2_cnt-1).

In a preferred embodiment, the prefetch unit maintains a prefetch counter. The counter is reset before starting a new prefetch for a loop. During prefetching, the counter value is incremented by 1 whenever a new byte is prefetched. Shortly before issuing vector load instructions, the vector processor has to issue a wait-prefetch instruction to check the prefetch counter. The instruction requires an input parameter, called wait counter, which defines how many bytes have to be prefetched before executing the vector instructions placed after the current wait-prefetch instruction. If the prefetch counter value is smaller than the wait counter, it implies that not all the required data is prefetched and the vector processor will be stalled at the current wait-prefetch instruction. However, in each cycle during stalling, the processor will continuously compare the prefetch counter with the wait counter. When the prefetch counter is equal to or greater than the wait counter, it implies that all required data have already been prefetched and the processor will resume from stalling and continue to execute the next instructions.

While the disclosed method can reduce prefetch-use latency, it also implies that both prefetch unit and the vector processor may need to access the vector memory simultaneously and so contention has to be resolved. Since prefetch unit prefetches data before data is used, it does not affect the overall performance if it cannot access the vector memory temporarily. However, the performance of the vector processor will be affected if it cannot access the vector memory immediately. Therefore, in one of the preferred embodiments, it is assumed that vector processor always has a higher priority to access the vector memory.

By way of an example, the following shows a source code before vectorization:
char Y[320], U[320], V[320], R[320], G[320], B[320];
Vector_256 y[20], u[20], v[20], r[20], g[20], b[20];
for (i=0; i<320; i++) {
   R[i]=Y[i]+1.140[i];
   G[i]=Y[i]−0.395 U[i]−0.581V[i];
   B[i]=Y[i]+2.032U[i];
}

After vectorization, each vector instruction processes 16 pieces of data in parallel, and so the number of iteration, hence execution time is greatly reduced. The code is converted as follows:
//After vectorization, 320 iterations become 320/16=20
for (i=0; i<20; i++) {//scaler instruction
  //function: Wait until numbers of bytes have been prefetched
  //prototype: void prefetch_wait(int byte_wait)
  prefetch_wait(2*16); //wait for 16 y and 16 v values to be prefetched
  r=y[i]+1.140v[i]; //vector instruction
  prefetch_wait(16); //wait for 16 u values to be prefetched
  g=y[i]−0.395u[i]−0.581v[i]; //vector instruction
  b=y[i]+2.032u[i]; //vector instruction
  //function: Store vector data from register to store queue
  //prototype: void vector_store(vector_t src, vector_t*dst)
  vector_store(r, R); //vector instruction
  vector_store(g, G); //vector instruction
  vector_store(b, B); //vector instruction
}

In addition to the aforementioned method, besides using a new prefetch method to reduce prefetch-use latency, in other embodiments the claimed invention also undertakes additional methods to increase the memory bandwidth to sustain a large number of parallel operations by the vector processor to achieve highly parallel vector processing. The vector memory has multiple memory banks where each can be accessed independently with different addresses. The prefetch unit and the vector processor also have additional features to further enhance the system performance.

For a word-aligned memory system, each word is 4-byte wide in an illustrative embodiment. The vector memory includes many small memory blocks where each block is, say 1-byte wide. In one of the preferred embodiments, all the data caches including L1 caches and L2 caches, are word-aligned.

If the data word to be prefetched is word-aligned, the whole data word can be prefetched in one cycle. If the data word to be prefetched is not word-aligned but byte-aligned as usual, a byte-aligned data cache may be implemented. However, this can lead to the substantially higher cost than for the word-aligned cache, thus the implementation of byte-aligned data cache is selected less frequently.

In case of using word-aligned data cache, what are prefetched are those unaligned words. Since the bytes of an unaligned word are stored separately in two adjacent words, it is required to load two aligned words from the memory to extract an unaligned word. However, it is possible for the prefetch unit to optimize the memory access to reduce the associated overhead.

In a preferred embodiment, each prefetch data stream is composed of many smaller bursts of continuous data stream, where a burst may correspond to a 2D stream, a 1D stream or a word in a 1D stream. In most cases, the prefetch unit fetches a continuous block of data, starting from an unaligned byte address. Although it takes 2 cycles, including $1^{st}$ cycle and $2^{nd}$ cycle, in the illustrative example to get the $1^{st}$ unaligned word, the $2^{nd}$ unaligned words can be obtained in the $3^{rd}$ cycle since some bytes of the $2^{nd}$ unaligned word are already fetched in the $2n^d$ cycle. By induction, it takes only one cycle to get each subsequent unaligned word of the continuous data block by combining some bytes of the currently loaded word with some bytes of the previously loaded word.

The prefetch unit employs an alignment module that fetches a continuous data burst efficiently. The alignment module contains a burst control unit, a byte address register, a word register and a word assembler. Initially, the burst control unit receives the first address of a data burst from the prefetch unit. If the address is word-aligned, the burst control unit will output a get_next_word signal to the prefetch address generator to fetch the following words of the burst until the burst ends. If the address is not word-aligned, the burst control unit will automatically fetch two consecutive words that contain all bytes of the first unaligned word before outputting the get_next_word signal to the prefetch address generator to fetch the following words until the burst ends. In the course of fetching an unaligned burst, the byte address register and the byte data register (not shown) store the previous issued address from the prefetch unit and the previously loaded data from the data cache. When loading the words following the first word, some bytes of a newly loaded word can be combined with some bytes of the data register to assemble a complete word. It then outputs the assembled word and the corresponding address to the vector memory. After completing a burst, it will fetch address of another data burst from the prefetch address generator and the process above will repeat.

To avoid bank conflicts, changing the strides of the destination streams is undertaken. In practice, the vector memory is divided into multiple small banks of memory and connected to the execution unit through a crossbar. Maximum memory throughput can only be achieved when every data request is sent to different memory banks, i.e. no memory access conflict. Usually, the source streams in the data cache are mapped to the destination streams of vector memory without changing the 1D-strides and 2D-strides. However, bank conflicts can be avoided by deliberately changing the stride values of some destination streams, if necessary, thus avoiding bank conflicts and maximizing memory throughput. Table 2 and table 3 detail how the change of the stride value eliminates bank conflict. The first table shows that the originally the bytes are padded without any space between them. In an illustrative example, byte 0, 4, 8 and 12 have to be loaded by the vector processor. Since they all reside on the same bank, they cannot be loaded simultaneously because of the bank conflict.

TABLE 2

| Bank 0 | Bank 1 | Bank 2 | Bank 3 |
| --- | --- | --- | --- |
| 0 | 1 | 2 | 3 |
| 4 | 5 | 6 | 7 |

TABLE 2-continued

| Bank 0 | Bank 1 | Bank 2 | Bank 3 |
|---|---|---|---|
| 8 | 9 | 10 | 11 |
| 12 | 13 | 14 | 15 |

Table 3 shows that by increasing the stride value, spaces are inserted between each word in the vector memory and the bank allocation for storing each byte is changed. Now the four requested bytes are stored in four different banks and they can be loaded simultaneously.

TABLE 3

| Bank 0 | Bank 1 | Bank 2 | Bank 3 |
|---|---|---|---|
| 0 | 1 | 2 | 3 |
| undefined | 4 | 5 | 6 |
| 7 | undefined | 8 | 9 |
| 10 | 11 | undefined | 12 |
| 13 | 14 | 15 | undefined |

Staggered loop execution is employed in particular embodiments with delay buffers and instruction scheduling. For achieving high performance, a multi-banked vector memory has to support as many simultaneous memory accesses as possible by employing a crossbar switch. Since the crossbar routing complexity is increased with the square of the number of banks, it is preferable to reduce the number of banks to the fewest possible. With a traditional vector processor, multiple execution units execute the same instruction with multiple data in the same cycle. In particular embodiments the claimed invention employs a plurality of staggered execution pipelines. Except for the first pipeline, the instruction fetching stage and the instruction decoding stage of each of other pipelines are replaced with a delay buffer stage. When starting to execute vector instructions, the instruction cache will only send the instructions to the first pipeline and all other pipelines remain idle. After an instruction is decoded in the first pipeline, the decoding result of the same instruction is sent to the delay buffering stage of the $(i+1)^{th}$ pipeline so that it can execute the instruction in the next cycle at their respective execution stages before writing the output in their respective write-back stages. As a result, the execution times of the same instruction by different pipelines are delayed by different number of cycles. In other words, each pipeline is executing different instructions at a particular cycle, thus creating a staggered SIMD execution system.

Meanwhile, during software programming, it is also ensured in preferred embodiments that any two vector-load/store instructions are at least separated by a certain number of non vector-load/store instructions. In one of the preferred embodiments, any two vector-load/store instructions are at least separated by a non vector-load/store instruction. Since for each two consecutive instructions, only one of them is a vector-load/store instruction, for each two adjacent pipelines, only one of them is executing a vector-load/store instruction. Therefore, an arbiter can be allocated for each pair of pipelines to allow an execution unit from one of them to access the vector memory at a time, without affect the performance. In short, by increasing the utilization, the number of crossbar ports can be reduced without compromising the memory throughput.

In one of the preferred embodiments addressing scaling to multi-core processing with L2 cache, one or multiple DSP sub-systems is connected to a L2 cache, which is in turn connected to slower main memory storage, such as SDRAM or DDR-SDRAM.

When there are more than one DSPs in a system, the L2 cache can be used for data exchange among different DSPs. To maximize the system operating speed, the complexity of the L1 cache associations has to be minimized since L1 cache access is on the critical paths of the design of most modern processors. Meanwhile, the L2 cache associations can be increased to enhance the efficiency of cache usage without affecting the speed. In one preferred embodiment, the system incorporates a 2-way set associative L1 caches and an 8-way set associated L2 cache. Moreover, each L1 cache implements a write-through policy while the L2 cache implements a write-back policy.

The prefetch unit can fetch data from either L1 cache or from L2 cache directly. If the prefetch unit prefetch data from L1 cache and the data are missed in the L1 cache, the L1 cache has to refill the corresponding cache line from the L2 cache. Alternatively, the prefetch unit can bypass the L1 cache and directly fetch data from the L2 cache. Since each L1 cache implements the write-through policy, L2 cache also contains the most updated data. As the prefetch data is mostly streaming data, the data is unlikely to be reused in the L1 cache after vector processing and so directly fetching data from L2 cache can make the L1 cache usage more efficient. Moreover, the execution unit can fetch data from L1 cache while the prefetch unit is using the L2 cache. During compiling time, either the compiler or programmer will instruct where the prefetch unit should fetch data through a special instruction.

Other aspects of the invention are also hereby disclosed for illustration but not by way of limitation.

BRIEF DESCRIPTION OF THE DRAWINGS

These and other objects, aspects and embodiments of this invention will be described hereinafter in more details with reference to the following drawings, in which.

DETAILED DESCRIPTION OF THE DRAWINGS

Figure 1:
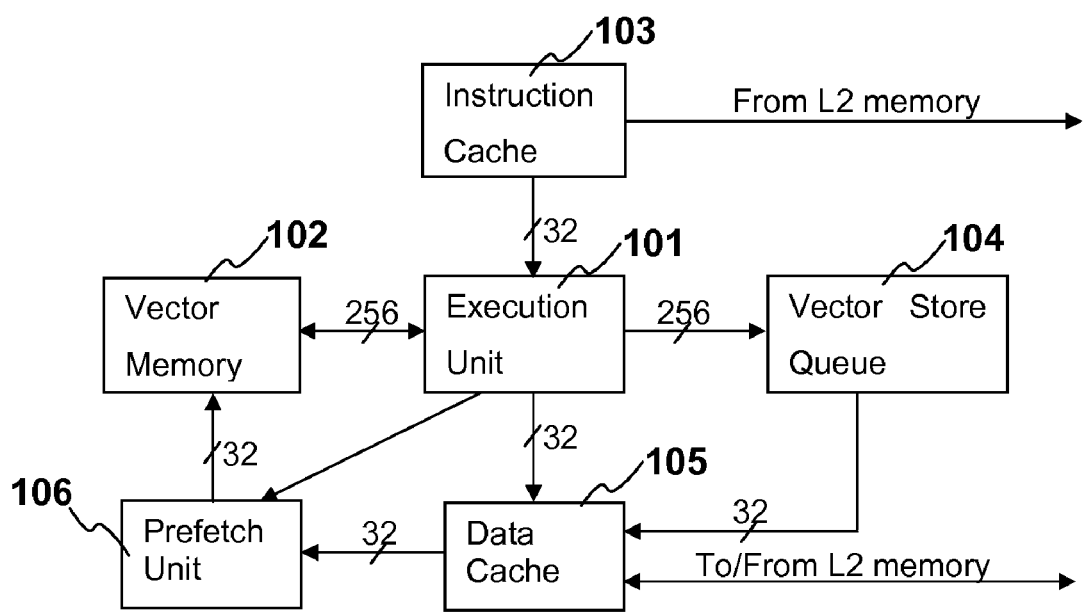
FIG. 1 shows a schematic representation of a vector DSP architecture.

FIG. 1 shows a vector DSP architecture consisting of an execution unit 101, an instruction cache 103, a data cache 105, a vector memory 102, a vector store queue 104 and a prefetch unit 106. The execution unit 101 can carry out both scalar instructions and vector instructions. In one illustrative embodiment, those scalar instructions can be any RISC (Reduced Instruction Set Computer) operations. In another illustrative embodiment, those vector instructions can be any operations for multimedia applications. Any instructions executed by the execution unit 101 are available in the instruction cache 103 so that the execution unit 101 can get whatever instructions to be executed from the instruction cache 103. In an illustrative embodiment, besides being available in the instruction cache 103 which is a L1 cache, an instruction can be available from L2 cache (not shown) and is to be loaded into the instruction cache 103 for the execution unit to access.

The execution unit 101 can access the data cache 105. In an embodiment, the execution unit 101 can write data to the data cache 105. In another embodiment the execution unit 101 can read data from the data cache 105. The data cache 105 is a L1 cache and the data in the data cache 105 can be further exchanged with those in a L2 cache (not shown).

Besides writing data directly to the data cache 105, the execution unit 101 can write data to the vector store queue 104. In an embodiment, the bandwidth between the execution unit 101 and the vector store queue 104 is larger than that between the execution unit 101 and the data cache 105. Therefore, data can be written to the vector store queue 104 first before the data are further sent to the data cache 105 from the vector store queue 104. The vector store queue 104 acts as a buffer between the execution unit 101 and the data cache 105. As a result, when executing vector store instructions, instead of waiting for data to be written to the data cache 105 under a limited bandwidth, the execution unit 101 can save the time to do other tasks by sending the data efficiently to the vector store queue 104 at a much higher data rate and let the vector store queue 104 feed the data to the data cache 105 under the limited bandwidth.

Execution unit 101 also reads data from the data cache 105. The data stored in the data cache 105 includes, for example, those written to the data cache 105 directly by the execution unit 101, those buffered by the vector store queue 104 and those accessible from the L2 cache.

The execution unit 101 can let the prefetch unit 106 know what the execution unit 101 requires so that the prefetch unit 106 can prefetch the data for the execution unit as soon as they become available. The prefetch unit 106 prefetches the data to the vector memory 102. The vector memory 102 also acts as a buffer, storing the data required by the execution unit 101 for later use, for example, the data can be those required to be reused from time to time or the data can be those required by the subsequent operations of the execution unit 101.

Figure 2:
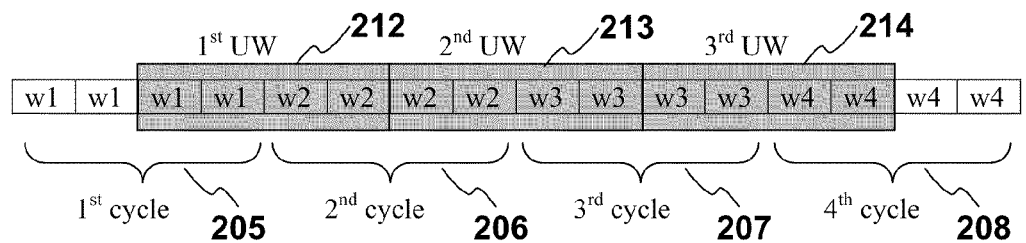
FIG. 2 shows a storage of continuous data stream in a word-aligned memory system.

FIG. 2 shows a storage of continuous data stream in a word-aligned memory system. In the word-aligned system, a word of data is read or written per cycle. Each word is 4-byte wide in the illustrative embodiment. For example, all the data caches including L1 caches and L2 caches are word-aligned. If the data required to be prefetched is also word-aligned, no further alignment is required and the prefetch unit can prefetch the data word by word per cycle, for example, word 1 in $1^{st}$ cycle 205, word 2 in $2^{nd}$ cycle 206, word 3 in $3^{rd}$ cycle 207, word 4 in $4^{th}$ cycle 208.

If the data required to be prefetched is not word-aligned, there can be situation that the starting address of the data required is unaligned with the starting address of a word in the data cache. In the illustrative embodiment of FIG. 2, what are required are the $1^{st}$ unaligned word 212, the $2^{nd}$ unaligned word 213 and the $3^{rd}$ unaligned word 214. Therefore, it takes two cycles, $1^{st}$ cycle 205 and $2^{nd}$ cycle 206, to obtain the $1^{st}$ unaligned word 212. It takes another two cycles, $2^{nd}$ cycle 206 and $3^{rd}$ cycle 207, to obtain the $2^{nd}$ unaligned word 213. It takes another two cycles, $3^{rd}$ cycle 207 and $4^{th}$ cycle 208, to obtain the $3^{rd}$ unaligned word 214. In this case, it shows that one more cycle is required to prefetch non-word-aligned data because it takes four cycles instead of three.

Figure 3:
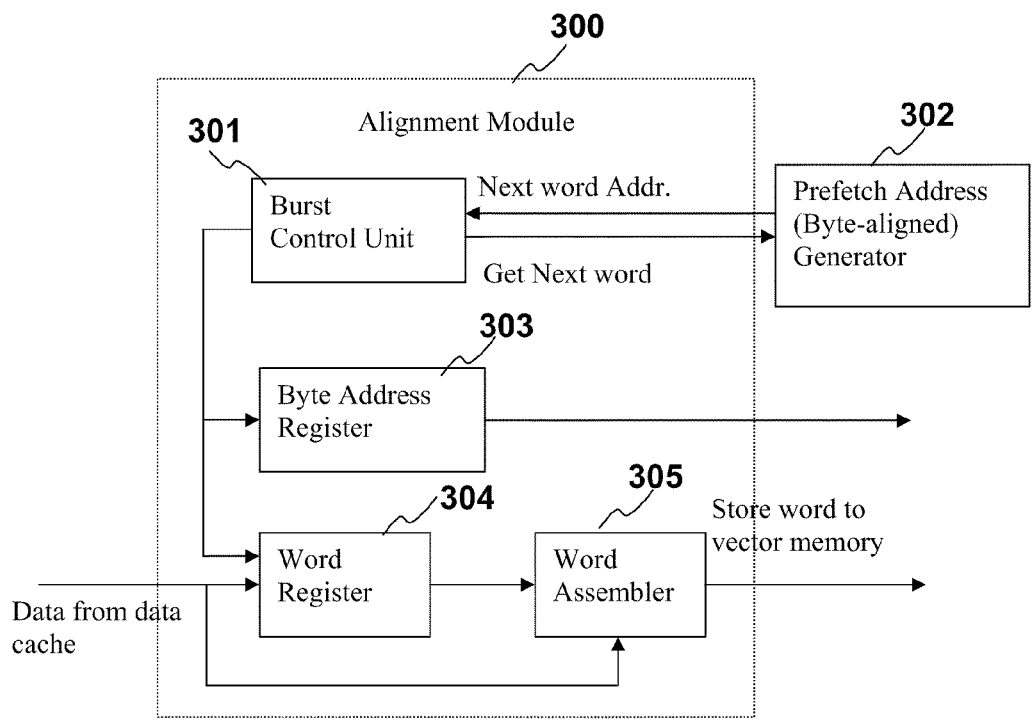
FIG. 3 shows an alignment module in the prefetch unit for performing word alignment during prefetching.

FIG. 3 shows an alignment module 300 in the prefetch unit for performing word alignment during prefetching. In a cycle, the word obtained by the prefetch unit contain data which is not required because the starting address to read in a cycle is not aligned with the starting address of the data required in the case of byte-aligned data. As a result, the words obtained by the prefetch unit need to be reassembled before storing the data in the vector memory. The alignment module contains a burst control unit 301, a byte address register 303, a word register 304 and a word assembler 305. Initially, the burst control unit 301 receives the first address from a data burst. If the address is word-aligned, the burst control unit 301 will output a get_next_word signal to the prefetch address generator 302 to fetch the following words of the burst until the burst ends. If the address is not word-aligned, the burst control unit 301 will automatically fetch two consecutive words that contain all bytes of the first unaligned word before outputting the get_next_word signal to the prefetch address generator 302 to fetch the following words until the burst ends. In the course of fetching an unaligned burst, the byte address register 303 and the byte data register (not shown) store the previously loaded address and the previously loaded data. When loading the words following the first word, some bytes of a newly loaded word can be combined with some bytes of the data register to assemble a complete word. It then output the assembled word and the corresponding address to the vector memory. After completing a burst, it will fetch address of another data burst from the prefetch address generator 302 and the process above will repeat.

Figure 4:
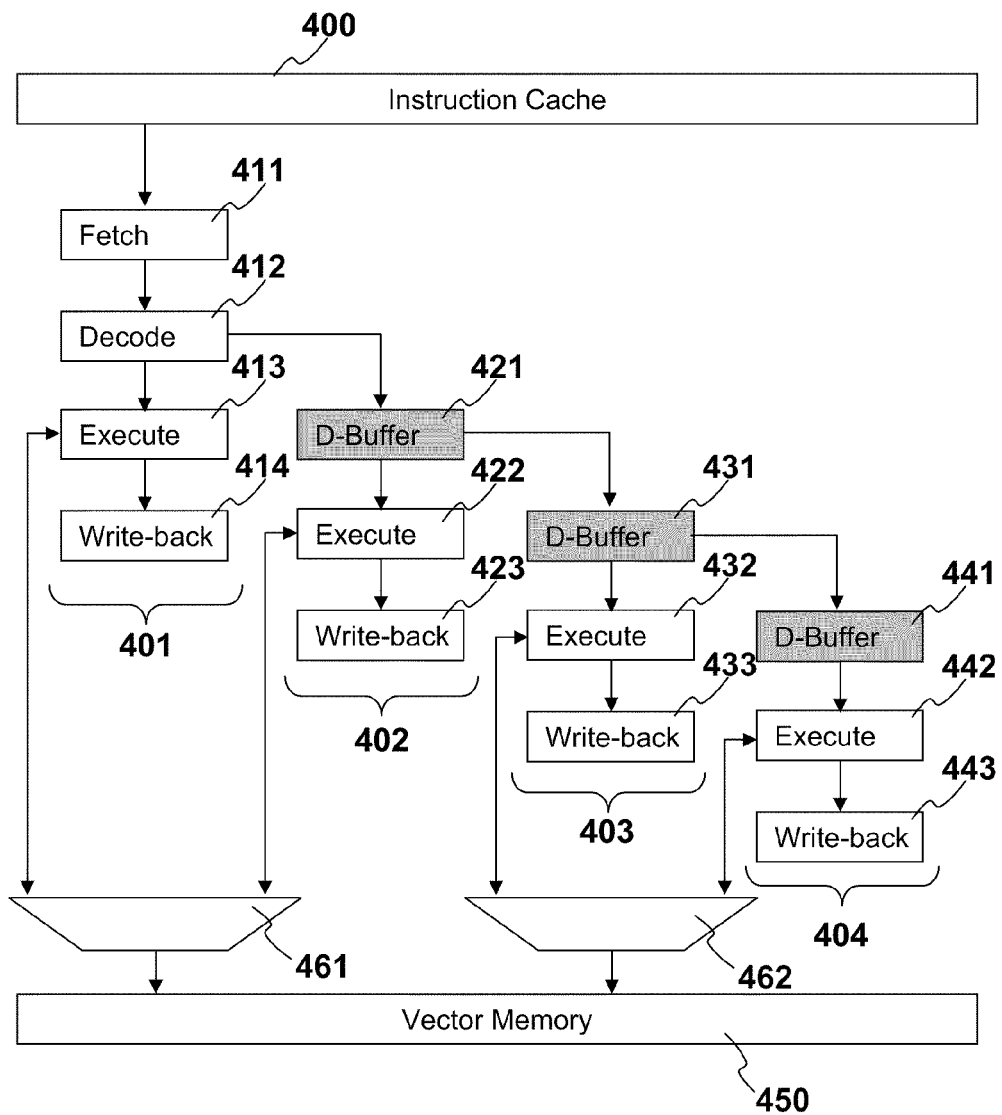
FIG. 4 shows a vector processing system containing a plurality of staggered execution pipelines.

FIG. 4 shows a vector processing system containing a plurality of staggered execution pipelines. Staggered loop execution is employed in particular embodiments with delay buffers 421, 431, 441 and instruction scheduling. For achieving high performance, a multi-banked vector memory 450 has to support as many simultaneous memory accesses as possible by employing a crossbar switch. Since the crossbar routing complexity is increased with the square of the number of banks, it is preferable to reduce the number of banks 461, 462 to the fewest possible. With a traditional vector processor, multiple execution units execute the same instruction with multiple data in the same cycle. In particular embodiments the claimed invention employs a plurality of staggered execution pipelines 401, 402, 403, 404. Except for the first pipeline 401, the instruction fetching stage 411 and the instruction decoding stage 412 of each of other pipelines are replaced with a delay buffer stage 421, 431, 441. When starting to execute vector instructions, the instruction cache 400 will only send the instructions to the first pipeline 401 and all other pipelines 402, 403, 404 remain idle. When the first pipeline 401 is executing an instruction at the execution stage 413 before writing it back in the write-back stage, the same instruction is sent to the delay buffering stage 421, 431, 441 of the $(i+1)^{th}$ pipeline so that it can execute the instruction in the next cycle at their respective execution stages 422, 432, 442 before writing the output in their respective write-back stages 423, 433, 443. As a result, the execution times of the same instruction by different pipelines are delayed by different number of cycles. In other words, each pipeline is executing different instructions at a particular cycle, thus creating a staggered SIMD execution system to prevent all the execution units to access the vector memory simultaneously.

Figure 5:
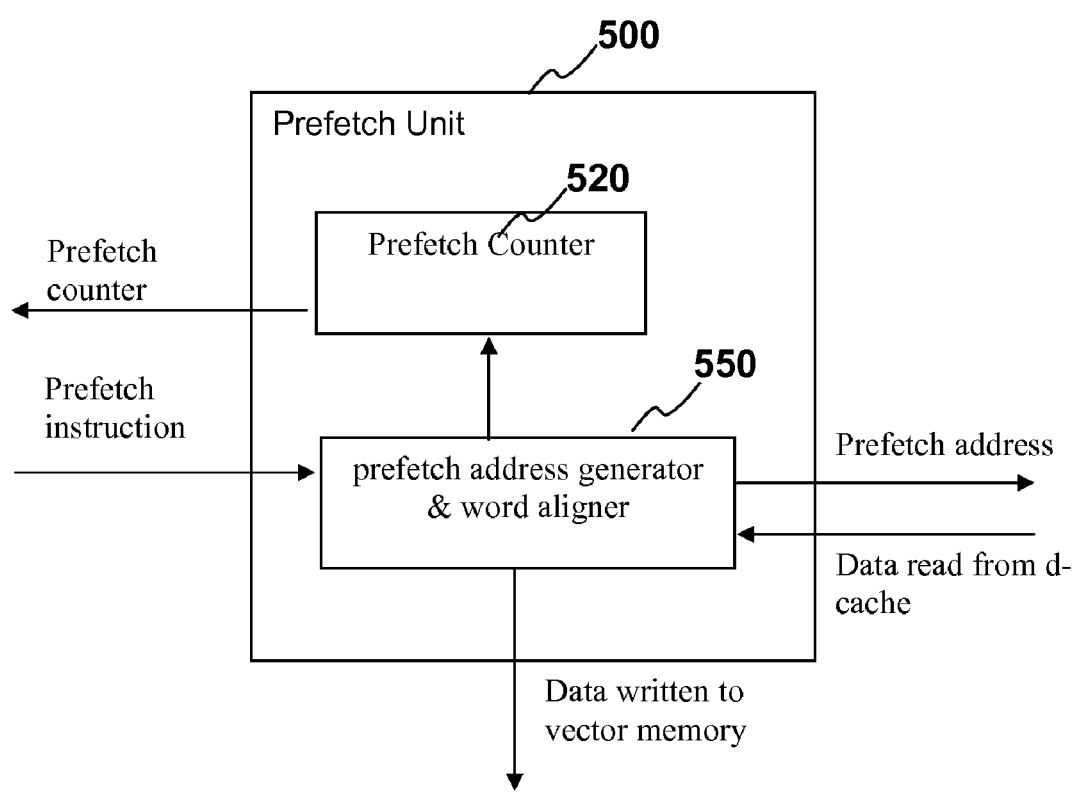
FIG. 5 shows a schematic diagram of a prefetch unit.

FIG. 5 shows a schematic diagram of a prefetch unit. The prefetch unit 500 includes a prefetch counter 520 and prefetch address generator & word aligner 550 in the illustrative embodiment as shown. The prefetch counter 520 will keep counting the data prefetched and inform the execution unit the number of the prefetched words or bytes to determine if it has enough data to execute an instruction. If the data is enough, then the execution unit will issue a vector load instruction to access the data available in the vector memory. The prefetch address generator & word aligner 550 issues a sequence of prefetch addresses to load data from data cache. As an example, there may be three data arrays including y[i], v[i], u[i]. The prefetch address generator & word aligner 550 can set the order of prefetching to be loading data for y[i], followed by data for v[i] and finally followed by data for u[i]. Therefore, the prefetch unit 500 prefetches to the execution unit the data for y[i] up to certain count according to the setting of the prefetch count, then prefetches to the execution unit the data for v[i] up to certain count according to the setting of the prefetch count and then prefetches to the execution unit the data for u[i] up to certain count according to the setting of the prefetch count.

The foregoing description of embodiments of the present invention are not exhaustive and any update or modifications to them are obvious to those skilled in the art, and therefore reference is made to the appending claims for determining the scope of the present invention.

INDUSTRIAL APPLICABILITY

The embodiments and arrangements described hereinafter are applicable to computer hardware and DSP devices amongst others.

What is claimed is:

1. A computer processing system for improving execution throughput of vector processing, comprising:
   an execution unit for executing one or more instructions from an instruction cache, wherein the execution unit comprises a vector execution unit;
   a vector memory for storing one or more data streams which are transferred from the vector memory to a vector register file when the vector execution unit issues a vector load command;
   a prefetch unit for obtaining data from a data cache and storing data in the vector memory such that the data from one or more data streams in the data cache are obtained in a round-robin manner and made available in the vector memory before the execution unit requests the data for executing an instruction; whereas the instruction is executed in one or more iterations using a portion of the data from one or more data streams which correspond to each iteration;
   a prefetch counter for counting the amount of data from one or more data streams which have become available in the vector memory for execution by the execution unit such that the execution unit starts executing the instruction in one or more iterations using at least a portion of data from the corresponding one or more data streams before all the data in each data stream are made available in the vector memory; whereas the execution unit compares the amount of data from one or more data streams which is required for executing the instruction in one or more iterations with the prefetch counter to determine when to start executing the instruction; and
   the vector execution unit executes the same instruction for one or more iterations in parallel in one or more staggered execution pipelines; wherein a delay of different durations is imposed in each staggered execution pipeline such that each port of the vector memory is only accessed by one iteration at a time.

2. The computer processing system according to claim 1, wherein:
   the vector execution unit containing one or more staggered pipelines to execute a sequence of instructions, whereas each memory-accessing instruction is followed by at least one non-memory-accessing instruction, wherein the memory-accessing instruction is an instruction which requires access to a port of the vector memory and the non-memory-accessing instruction does not require any access to any port of the vector memory such that each memory-accessing instruction in at least one staggered execution pipeline is scheduled to avoid each port of the vector memory from being accessed by more than one iteration.

3. The computer processing system according to claim 1, wherein:
   the vector execution unit which executes one or more vector instructions and accesses the vector memory directly and the data cache through a vector store queue; and
   the execution unit further comprising a scalar execution unit which executes one or more scalar instructions and accesses the data cache.

4. The computer processing system according to claim 3, further comprising:
   a vector store queue is connected to the data cache through a data cache memory port and to the vector execution unit through a vector execution memory port that has higher bandwidth than the data cache memory port.

5. The computer processing system according to claim 1, wherein:
   the vector memory configured to be a multi-banked memory for functioning as a prefetch buffer for one or more data streams and as a general-purpose data memory for the vector execution unit.

6. The computer processing system according to claim 5, further comprising:
   a crossbar connecting the multi-banked vector memory to the vector execution unit.

7. The computer processing system according to claim 5, wherein:
   the prefetch unit fetches one or more data streams from the data cache to the vector memory in a manner that the data of different iterations becomes available in different banks of the vector memory such that the same instruction is executed by different iterations using data in different banks to avoid any bank conflict.

8. The computer processing system according to claim 7, wherein:
   each data stream is characterized by at least three parameters including a base address, a count value and a stride value; and
   the prefetch unit changes the stride value of at least one data stream when fetching the data stream from the data cache to the vector memory such that each iteration needs to access different banks of the vector memory for executing the same instruction.

9. The computer processing system according to claim 1, wherein:
   the vector execution unit has a higher priority than the prefetch unit in accessing the vector memory such that when both the vector execution unit and the prefetch unit needs to access the vector memory simultaneously, the vector execution unit accesses the vector memory before the prefetch unit does.

10. A computer processing system for improving execution throughput of vector processing, comprising:
    an execution unit for executing one or more instructions from an instruction cache, wherein the execution unit comprises a vector execution unit;
    a vector memory for storing one or more data streams which are transferred from the vector memory to a vector register file when the vector execution unit issues a vector load command;
    a prefetch unit for obtaining data from a data cache and storing data in the vector memory such that the data from one or more data streams in the data cache are obtained in a round-robin manner and made available in the vector memory before the execution unit requests the data for executing an instruction; whereas the instruction is executed in one or more iterations using a portion of the data from one or more data streams which correspond to each iteration; and a prefetch counter for counting the amount of data from one or more data streams which have become available in the vector memory for execution by the execution unit such that the execution unit starts executing the instruction in one or more iterations using at least a portion of data from the corresponding one or more data streams before all the data in each data stream are made available in the vector memory; whereas the execution unit compares the amount of data from one or more data streams which is required for executing the instruction in one or more iterations with the prefetch counter to determine when to start executing the instruction.

11. The computer processing system according to claim 10, wherein:

the vector execution unit executes one or more vector instructions and accesses the vector memory directly and the data cache through a vector store queue; and the execution unit further comprises a scalar execution unit which executes one or more scalar instructions and accesses the data cache.

12. The computer processing system according to claim 11, wherein:

a vector store queue is connected to the data cache through a data cache memory port and to the vector execution unit through a vector execution memory port that has higher bandwidth than the data cache memory port.

13. The computer processing system according to claim 10, wherein:

the vector memory configured to be a multi-banked memory for functioning as a prefetch buffer for one or more data streams and as a general-purpose data memory for the vector execution unit.

14. The computer processing system according to claim 13, further comprising:

a crossbar connecting the multi-banked vector memory to the vector execution unit.

15. The computer processing system according to claim 13, wherein:

the prefetch unit fetches one or more data streams from the data cache to the vector memory in a manner that the data of different iterations becomes available in different banks of the vector memory such that the same instruction is executed by different iterations using data in different banks to avoid any bank conflict.

16. The computer processing system according to claim 15, wherein:

each data stream is characterized by at least three parameters including a base address, a count value and a stride value; and the prefetch unit changes the stride value of at least one data stream when fetching the data stream from the data cache to the vector memory such that each iteration needs to access different banks of the vector memory for executing the same instruction.

17. The computer processing system according to claim 10, wherein:

the vector execution unit executes the same instruction for one or more iterations in parallel in one or more staggered execution pipelines; wherein a delay of different durations is imposed in each staggered execution pipeline such that each port of the vector memory is only accessed by one iteration at a time.

18. The computer processing system according to claim 17, wherein:

the vector execution unit containing one or more staggered pipelines to execute a sequence of instructions, whereas each memory-accessing instruction is followed by at least one non-memory-accessing instruction; wherein the memory-accessing instruction is an instruction which requires access to a port of the vector memory and the non-memory-accessing instruction does not require any access to any port of the vector memory such that each memory-accessing instruction in at least one staggered execution pipeline is scheduled to avoid each port of the vector memory from being accessed by more than one iteration.

19. A method for improving execution throughput of vector processing by a computer processing system, comprising:

fetching data by a prefetch unit from a data cache to a vector memory such that the data from one or more data streams in the data cache are obtained in a round-robin manner and made available in the vector memory before the execution unit requests the data for executing an instruction; whereas the instruction is executed in one or more iterations using a portion of the data from one or more data streams which correspond to each iteration; and counting by a prefetch counter the amount of data from one or more data streams which have become available in the vector memory for execution by the execution unit such that the execution unit starts executing the instruction in one or more iterations using at least a portion of data from the corresponding one or more data streams before all the data in each data stream are made available in the vector memory; whereas the execution unit compares the amount of data from one or more data streams which is required for executing the instruction in one or more iterations with the prefetch counter to determine when to start executing the instruction.

20. The method according to claim 19, further comprising:

executing the same instruction for one or more iterations in parallel in one or more staggered execution pipelines; wherein a delay of different durations is imposed in each staggered execution pipeline such that each port of the vector memory is only accessed by one iteration at a time.

* * * * *